United States Patent
Chang et al.

(10) Patent No.: US 6,982,299 B2
(45) Date of Patent: ***Jan. 3, 2006

(54) WEATHERABLE RESIN COMPOSITIONS HAVING LOW GLOSS APPEARANCES

(75) Inventors: Moh-Ching Oliver Chang, Wexford, PA (US); Allen R. Padwa, Worcester, MA (US); Chuan-Ju Chen, Amherst, MA (US); Daniel Dufour, Langenfeld (DE)

(73) Assignees: Lanxess Corporation, Pittsburgh, PA (US); Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/230,769

(22) Filed: Aug. 29, 2002

(65) Prior Publication Data
US 2004/0044129 A1    Mar. 4, 2004

(51) Int. Cl.
*C08G 63/48*    (2006.01)
(52) U.S. Cl. ............................ 525/64; 525/66; 525/69; 525/70; 525/74; 525/80; 525/85
(58) Field of Classification Search .................. 525/64, 525/66, 69, 70, 74, 80, 85
See application file for complete search history.

(56) References Cited

U.S. PATENT DOCUMENTS

| | | | |
|---|---|---|---|
| 4,460,742 A | 7/1984 | Kishida et al. | 525/64 |
| 4,894,416 A | 1/1990 | Gallucci | 525/74 |
| 5,270,386 A | 12/1993 | Laughner | 525/66 |
| 5,286,790 A | 2/1994 | Laughner | 525/67 |
| 5,430,101 A | 7/1995 | Minematsu et al. | 525/73 |
| 5,512,632 A | 4/1996 | Serini et al. | 525/67 |
| 5,539,030 A | 7/1996 | Laughner | 524/141 |
| 5,543,448 A | 8/1996 | Laughner | 524/109 |
| 5,580,924 A | 12/1996 | Wildi et al. | 525/65 |

FOREIGN PATENT DOCUMENTS

EP        0 285 969       * 3/1988

* cited by examiner

*Primary Examiner*—Jeffrey Mullis
(74) *Attorney, Agent, or Firm*—Jill Denesvich

(57) ABSTRACT

A low gloss thermoplastic molding composition comprising a grafted acrylate rubber (ASA) and a process for its preparation are disclosed. The composition contains an effective amount of a gloss-reducing agent that is the reaction product of
(i) compound having two or more maleic anhydride groups per molecule and
(ii) compound having two or more terminal primary amine groups per molecule.
The incorporation of the gloss reducing agent in the inventive composition may be by blending the reaction product or, in the alternative, blending the reactants (i) and (ii) in the molten ASA under process conditions designed to bring about the in situ formation of the inventive gloss reducing agent.

19 Claims, No Drawings

WEATHERABLE RESIN COMPOSITIONS HAVING LOW GLOSS APPEARANCES

FIELD OF THE INVENTION

This invention relates to thermoplastic molding compositions and more particularly to low gloss compositions containing an acrylate-styrene-acrylonitrile interpolymer.

SUMMARY OF THE INVENTION

A low gloss thermoplastic molding composition comprising a grafted acrylate rubber (ASA) and a process for its preparation are disclosed. The composition contains an effective amount of a gloss-reducing agent that is the reaction product of
(i) a compound having two or more maleic anhydride groups per molecule and
(ii) a compound having two or more terminal primary amine groups per molecule.

The incorporation of the gloss reducing agent in the inventive composition may be by blending the reaction product or, in the alternative, blending the reactants (i) and (ii) in the molten ASA under process conditions designed to bring about the in situ formation of the inventive gloss reducing agent.

DESCRIPTION OF THE PRIOR ART

Products prepared of thermoplastic molding compositions are often times glossy, yet for some applications this is not a desirable property. There is considerable need for low-gloss compositions especially in applications such as computer housings, keyboards, appliances and automotive parts.

Elimination of gloss by surface embossing has been practiced but requires a separate step and adds cost, Moreover, subsequent abrasion may remove the embossed matte surface and cause the gloss to reappear. Addition of a finely-divided filler, such as silica, silicate or aluminate or other similarly inert minerals has been demonstrated to reduce the gloss of thermoplastic molding compositions yet this is often accompanied by an undesirable reduction in the level of at least some physical and/or mechanical properties of the molded article, most notably the impact strength. In addition to the adverse effect on the impact strength, there is often a corresponding decline of the heat distortion temperature, decline in the weld line strength, deficient weathering and light stability, as well as other important properties.

U.S. Pat. No. 4,460,742 disclosed a delustered thermoplastic resin composition containing a thermoplastic resin, such as acrylic resin, and a component that contains the crosslinked polymerization product of a $C_{1-4}$ alkyl methacrylate and a copolymer of aromatic vinyl and $C_{1-13}$-alkyl acrylate.

U.S. Pat. No. 4,894,416 disclosed a low gloss thermoplastic blend with good physical properties that contains a core-shell ASA (acrylate-styrene-acrylonitrile interpolymer) resin blended with a polymer of glycidyl (meth)acrylate.

U.S. Pat. No. 5,580,924 disclosed reduced gloss thermoplastic compositions entailing compounding a styrene-acrylonitrile copolymer (SAN) in the presence of an electrophilic reagent and an acid to form a gel, and then compounding the resultant gels with polycarbonate, SAN and ABS graft polymer to form an PC/ABS/SAN composition having reduced gloss.

Acrylonitrile-styrene-acrylate interpolymers (hereinafter referred to as "ASA resins") are well known in the art, and have many favorable features such as good strength and outstanding weathering resistance. Attempts to reduce the high gloss of these resins met with the disadvantages that were discussed above. It is, therefore, desired to reduce the gloss of ASA resins while at the same time retaining the level of their mechanical properties.

DETAILED DESCRIPTION OF THE INVENTION

The composition of the invention comprises a blend of:
(a) ASA resin; and (b) an effective amount of a gloss-reducing agent.

Preferably the ASA resin is present in the composition in an amount of at least 85% and less than 98.4%, preferably 88 to 98%, most preferably 92 to 97.9%, and the gloss reducing agent is present in an amount greater than 1.6% and up to 15%, preferably 2 to 12%, most preferably 2.1 to 8%, the percents being relative to the weight of the composition.

It has been found that such a composition provides substantial reduction in gloss while retaining desirable physical properties such as impact strength, tensile strength as well as good thermal properties.

Component (a), the ASA resin (acrylate-styrene-acrylonitrile interpolymer), is known as an impact-modified, substantially-thermoplastic resin which comprises a SAN matrix in which is dispersed a grafted acrylate elastomer phase as impact modifier. Advantageous ASA resins which are commercially available comprise a crosslinked (meth) acrylate elastomer, a crosslinked SAN copolymer and a substantially linear SAN copolymer. Methylated styrene, such as α-methyl styrene or vinyltoluene, may be used in place of all or part of the styrene.

The ASA resins may be prepared by a variety of known methods involving emulsion or bulk polymerization. The preferred resins of the ASA type are of core-shell structure; these structures are well known in the art and have been more fully disclosed in U.S. Pat. No. 3,944,631 that is incorporated herein by reference. The (meth)acrylate elastomer core portion of these resins may be composed of alkyl, aryl, or arylalkyl esters of acrylic or methacrylic acids. The core-shell portion of the resin may be prepared by a two-step process in which the (meth)acrylate elastomer core (which is often slightly crosslinked with polyfunctional vinyl compounds) is grafted with a thermoplastic shell of poly(methyl methacrylate), polystyrene, styrene-acrylonitrile copolymer, or similar vinyl polymers or copolymers. The core-shell structure is then blended with uncrosslinked polymer, such as poly(methyl methacrylate), polystyrene, styrene-acrylonitrile copolymer, or similar vinyl polymers or copolymers, to form ASA resin.

The most preferred ASA resins contains about 15 to about 85% of an uncrosslinked matrix of acrylonitrile-styrene copolymer polymerized and blended with a core-shell impact modifier, typically about 10 to 50% of a crosslinked (meth)acrylate elastomer core with about 5 to about 35% of a crosslinked styrene-acrylonitrile copolymer shell.

Suitable crosslinking agents include polyfunctional ethylenically unsaturated monomer, such as diallyl fumarate and diallyl maleate. The shell and core are believed to be linked by having interpenetrating molecular networks, and the term "interpolymer" is applied to such products having such networks.

Other ASA resins which may be advantageously used in the composition of the invention are the types disclosed in U.S. Pat. Nos. 3,655,824; 3,830,878; 3,991,009; 4,433,102; 4,442,263 and 4,409,363, all of which are incorporated herein by reference. These ASA resins have in common the use of the three monomers, namely acrylate ester, styrene (or α-methylstyrene), and acrylonitrile, to make a thermoplastic composition with good impact, heat distortion and weathering characteristics. They differ principally in the method of manufacture and in the detailed structure of the essential rubbery phase and the interphase if any. As a class, the ASA resins have relatively similar blending properties in view of their outer continuous phase of acrylonitrile-styrene copolymer.

The gloss reducing agent of the present invention is the reaction product of:
  (i) a compound having two or more maleic anhydride groups per molecule, with
  (ii) a compound having two or more terminal primary amine groups per molecule (average amine functionality greater than 1.8 per molecule).

The gloss reducing agent may be incorporated in the composition as the pre-formed reaction product of (i) and (II) or introduced into the ASA melt as individual reactants in their pre-reacted form. In this later case, the reaction product is formed under the thermal condition in the course of melt blending, such as in the course of extrusion to form the inventive low gloss composition.

The maleic anhydride compound suitable in the context of the invention is a compound (optionally, an oligomeric compound) having a number average molecular weight of at least 2000 g/mole, that contains at least 2 maleic anhydride functional groups per molecule and includes in its molecular structure elements derived from (a) at least one vinyl monomer that contains no maleic anhydride functionality and (b) at least one maleic anhydride functional group.

The molecular weight (number average molecular weight) of the suitable maleic anhydride compound is at least 2,000, and preferably 25,000 to about 100,000, most preferably 3,000 to 75,000 g/mole. The compound contains at least 2 maleic anhydride functional groups per molecule, preferably 2 to 200, most preferably 5 to 180 maleic anhydride functional groups.

Among the suitable vinyl monomers that are free of maleic anhydride functionality, mention may be made of ethylene, propylene, styrene, acrylonitrile, (meth)acrylic acid ester, and vinyl acetate.

The preferred maleic anhydride compounds are styrene-methyl methacrylate-maleic anhydride and styrene-maleic anhydride copolymers.

The suitable amine compound contains polyolefinic or polyether structural elements, and at least two terminal primary amine functional groups per molecule. The preferred structure contains at least one of polyethylene, polypropylene and polyether structural units, and the most preferred contains structural units of polypropylene oxide. The number average molecular weight of the suitable amine compound is generally, 300 to 18,0000, preferably 400 to 15,000, most preferably 700 to 10,000, and the compound contains at least 2 (average amine functionality greater than 1.8), preferably 2 to 5, most preferably 3 to 4, terminal primary amine functional groups per molecule. The most preferred amine compound is polypropylene oxide having a molecular weight of 4000 to 6000 and containing 3 terminal primary amine functional groups per molecule.

Importantly, the total of the maleic anhydride groups of the maleic anhydride compound and the terminal primary amine functional groups of the amine compound is greater than 4.

The reaction for the preparation of the gloss reducing agent is well known and may be prepared by procedures that are known to the art-skilled.

The gloss reducing agent may also be incorporated in the inventive composition as the pre-reacted reactants. In this embodiment of the invention, the maleic anhydride compound and the amine compounds are blended together with the ASA resin in sufficient amounts to result, under the thermoplastic processing conditions, in the formation of the reaction product.

An effective amount of the gloss reducing agent is generally in the range of more than 1.6 and up to 15%, preferably 2 to 12%, most preferably 2.1 to 8%, relative to the weight of the composition (total weight of ASA and gloss reducing agent). Lesser amounts give inadequate gloss reduction, greater amounts are excessively costly and may adversely affect physical properties of the blend or molded articles made therefrom.

The inventive composition may be modified by the addition of additives for their art-recognized function. Such additives include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The preparation of the inventive composition may be carried out by blending the ASA resin with the pre-prepared reaction product or, in the alternative, with the pre-reacted reactants that react in the course of the thermoplastic processing of the composition to form the gloss reducing agent. The blending, in either embodiment of the invention may be carried out by conventional means and following procedures that are well known to the art-skilled. Blending or kneading may be carried out by machines such as a Banbury mixer or an extruder, or in the alternative by solvent blending. The sequence of addition is not critical but the components should be thoroughly blended together and under time and temperature conditions conducive for the reaction to be completed.

The invention will be better understood with reference to the following examples, which are presented for purposes of illustration rather than for limitation, and which set forth the best mode contemplated for carrying out the invention.

EXAMPLES

The properties of the exemplified compositions were determined as noted below:

MFI—refers to the melt flow index, in g/10 min. determined according to ASTM D1238, under load of 10 kg at 220° C.;

MMP—refers to the molding pressure needed for filling 99% of the mold cavity, indicated in psi and determined at 490° F.

Vicat—refers to the softening temperature (1 Kg), expressed in ° C. determined according to ASTM D1525. The temperature of the oil increased at a rate of 2° C./minute.

DTUL—is the deflection temperature under load (264 psi (1.8 MPa)), expressed in ° C., determined according to ASTM D648. The temperature of the oil increased at a rate of 2° C./minute.

Impact strength—refers to Izod impact strength (specimens thickness of ⅛" and ½") expressed as ft-lbs./in. was determined at room temperature (RT) and at −30° C. in accordance with ASTM D256. The samples measured 6.35 cm×1.27 cm×indicated thickness.

Tensile properties: determined at room temperature using an Instron universal machine with cross-head speed of 5 mm/minute in accordance with ASTM D-638. Type I tensile bars were used.

Gloss (at 200 and 60° C.) was measured at room temperature in accordance with the procedure set forth in ASTM D523 using a Gardner gloss meter on molded plaques (10.2×7.6×0.32 cm)

Flexural properties: determined at room temperature using an Instron universal machine; cross-head speed 0.05 in/minute; in accordance with ASTM D-790. The samples measured 6.35×1.27×3.18 cm.

In carrying out the following examples, the compositions were based on identical ASA material and contained, in addition to the gloss reducing agent, small amounts of conventional additives having no present relevance to the findings and no criticality to the invention. The ASA material in all the examples contained about 20% by weight of butyl acrylate rubber grafted with SAN (the weight ratio of rubber to the grafted SAN was 100:80 for ASA 1 and 100:60 for ASA 2. In ASA 1 and ASA 2 the weight ratio of the styrene to acrylonitrile was about 70/30).

The components of the gloss reducing agent used in the exemplified compositions are present in the indicated amounts, expressed as parts by weight per one hundred parts of resin(pphr).

The maleic anhydride compound designated as MA 1 was a styrene/methyl methacrylate/maleic anhydride copolymer (the components relate by weight one to the others as 68/7/25) having a number average molecular weight of 60,000 g/mole.

The maleic anhydride compound designated as MA 2 was a styrene/maleic anhydride copolymer (weight ratio of 75/25) having a number average molecular weight of 4,000 g/mole.

The amine compound referred to as triamine was a primary poly(propylene oxide) triamine having approximate molecular weight of 5000 g/mole.

The amine compound referred to in the examples as diamine was a primary poly(propylene oxide) diamine having approximate molecular weight of 2000 g/mole.

The material designated ASA 1 was a blend of butyl acrylate rubbers (average particle sizes of the components of the blend were 0.4 microns and 0.15 microns). The rubbers included styrene-acrylonitrile copolymer grafted onto a core-shell structured rubber substrate. The core contains styrene and the shell was crosslinked poly(butyl acrylate).

The material designated ASA 2 was styrene-acrylonitrile copolymer grafted onto a crosslinked poly(butyl acrylate-acrylonitrile) rubber substrate having a monomodal particle size distribution, with average particle size of 0.15 microns.

TABLE 1

| Rubber: ASA 1 | A-0 (c) | A-1 (c) | A-2 | A-3 |
|---|---|---|---|---|
| MA 1 | 0.0 | 5.0 | 5.0 | 5.0 |
| Triamine | 0.0 | 0.0 | 0.0 | 3.1 |
| Diamine | 0.0 | 0.0 | 2.5 | 0.0 |
| MFI | 4.0 | 2.6 | 1.3 | 0.9 |
| MMP, psi | 986 | 1001 | 1073 | 1102 |
| Vicat, ° C. | 110.2 | 112.6 | 110.2 | 111.1 |
| DTUL, ° C. | 82.6 | 83.2 | 79.2 | 78.7 |
| Impact strength (1/8" at RT) | 2.9 | 2.5 | 1.9 | 3.8 |
| Impact strength (1/8" at −30° C.) | 0.7 | 0.5 | 0.5 | 0.7 |
| Impact strength 1/2" at RT) | 2.1 | 2.0 | 1.6 | 2.4 |
| Impact strength (1/2" at −30° C.) | 0.7 | 0.8 | 0.6 | 0.9 |
| Tensile strength at yield, psi | 5655 | 5540 | 5450 | 5190 |
| Tensile strength at Failure, psi | 4770 | 4840 | 4640 | 4520 |
| Elongation, % | 80 | 82 | 95 | 100 |
| Modulus, $10^{-5}$ psi | 2.4 | 2.3 | 2.2 | 2.1 |
| Haze, % | 50 | 62 | 420 | 389 |
| Gloss (20°) | 90 | 89 | 36 | 30 |
| Gloss (60°) | 96 | 95 | 77 | 76 |
| Flexural yield stress, psi | 10050 | 40060 | 9585 | 8945 |
| Flexural modulus, $10^{-5}$ psi | 3.5 | 3.5 | 3.3 | 3.0 |

(c) denotes a comparative example.

The results clearly point to the gloss reducing effect resulting upon the inclusion of the inventive gloss reducing agent in the composition.

In a second set of experiments, the maleic anhydride compound designated as MA 2 was used as a component of the gloss reducing agent. The results are summarized in Table 2.

TABLE 2

| Rubber: ASA 1 | B-0 (c) | B-1 (c) | B-2 | B-3 |
|---|---|---|---|---|
| MA 2 | 0.0 | 1.0 | 1.0 | 1.0 |
| Triamine | 0.0 | 0.0 | 0.0 | 7.5 |
| Diamine | 0.0 | 0.0 | 4.5 | 0.0 |
| MMP, psi | 986 | 1015 | 1030 | 986 |
| Impact strength (1/8" at RT) | 2.9 | 2.1 | 1.3 | 1.2 |
| Impact strength (1/8" at −30° C.) | 0.7 | 0.5 | 0.5 | 0.5 |
| Impact strength (1/2" at RT) | 2.1 | 1.8 | 1.2 | 1.1 |
| Impact strength (1/2" at −30° C.) | 0.7 | 0.7 | 0.5 | 0.6 |
| Tensile strength at yield, psi | 5655 | 5740 | 4650 | 4180 |
| Tensile strength at Failure, psi | 4770 | 4930 | 4495 | 4175 |
| Elongation, % | 80 | 87 | 100 | 75 |
| Modulus, 10 | 2.4 | 2.4 | 2.1 | 1.9 |
| Haze, % | 50 | 60 | 175 | 181 |
| Gloss (20°) | 90 | 87 | 74 | 72 |
| Gloss (60°) | 96 | 95 | 91 | 90 |
| Flexural yield stress, psi | 10050 | 10120 | 8250 | 7740 |
| Flexural modulus, $10^{-5}$ psi | 3.5 | 3.5 | 3.0 | 2.9 |

(c) denotes a comparative example.

The results clearly point to the gloss reducing effect resulting upon the inclusion of the inventive gloss reducing agent in the composition.

A set of experiments the results of which are summarized below shows the efficacy of triamine as a component of the gloss reducing agent.

TABLE 3

| Rubber: ASA 1 | C-0 (c) | C-1 (c) | C-2 (c) | C-3 | C-4 | C-5 | C-6 |
|---|---|---|---|---|---|---|---|
| MA 1 | 0.0 | 0.0 | 1.0 | 2.0 | 3.0 | 4.0 | 5.0 |
| Triamine | 0.0 | 0.8 | 0.6 | 1.3 | 1.9 | 2.5 | 3.1 |

TABLE 3-continued

| Rubber: ASA 1 | C-0 (c) | C-1 (c) | C-2 (c) | C-3 | C-4 | C-5 | C-6 |
|---|---|---|---|---|---|---|---|
| MFI | 4.9 | — | 2.3 | 1.9 | 1.6 | 0.8 | 0.6 |
| MMP, psi | 928 | 957 | 986 | 1015 | 1001 | 1015 | 1044 |
| Vicat ° C. | 103.8 | — | 103.2 | 103.3 | 102.8 | 101.8 | 100.4 |
| DTUL, ° C. | 82.6 | — | 82.2 | 81.8 | 82.0 | 80.8 | 80.5 |
| Impact strength (⅛" at RT) | 2.8 | — | 3.0 | 2.9 | 2.8 | 4.1 | 3.9 |
| Impact strength (¼" at RT) | 1.7 | — | 1.8 | 1.9 | 2.0 | 2.1 | 2.2 |
| Tensile strength at yield, psi | 5380 | 5310 | 5360 | 5300 | 5240 | 5080 | 4990 |
| Tensile strength Failure, psi | 4740 | 4560 | 4830 | 4680 | 4740 | 4580 | 4500 |
| Elongation, % | 84 | 77 | 94 | 87 | 95 | 94 | 100 |
| Modulus, $10^{-5}$ psi | 3.3 | 3.3 | 3.2 | 3.1 | 3.2 | 2.9 | 2.9 |
| Haze, % | 33 | 52 | 71 | 122 | 221 | 283 | 338 |
| Gloss (20°) | 92 | 89 | 89 | 83 | 70 | 61 | 46 |
| Gloss (60°) | 97 | 96 | 96 | 95 | 91 | 88 | 80 |

(c) denotes a comparative example.

A yet additional set of experiments based on ASA 2 was carried out as reported in Table 4.

TABLE 4

| Rubber: ASA 2 | D-0 (c) | D-1 (c) | D-2 | D-3 | D-4 | D-5 |
|---|---|---|---|---|---|---|
| MA 2 | 0.0 | 1.0 | 2.0 | 3.0 | 4.0 | 5.0 |
| Triamine | 0.0 | 0.6 | 1.3 | 1.9 | 2.5 | 3.1 |
| MFI | 5.8 | 4.0 | 4.2 | 3.5 | 2.8 | 2.0 |
| MMP | 827 | 841 | 870 | 885 | 914 | 943 |
| Vicat (5 Kg) ° C. | 103.1 | 101.3 | 101.6 | 101.5 | 101.4 | 99.7 |
| DTUL, ° C. | 83.9 | 81.3 | 81.3 | 80.8 | 80.1 | 80.2 |
| Impact strength (⅛" at RT) | 0.9 | 2.6 | 3.1 | 5.0 | 5.1 | 5.4 |
| Impact strength (¼" at RT) | 1.5 | 1.8 | 1.9 | 2.0 | 2.2 | 2.3 |
| Tensile strength at yield, psi | 6110 | 5700 | 5470 | 5310 | 5230 | 5080 |
| Tensile strength at Failure, psi | 4400 | 4580 | 4430 | 4210 | 4150 | 4210 |
| Elongation, % | 20 | 40 | 50 | 38 | 40 | 58 |
| Modulus, $10^{-5}$ psi | 3.3 | 3.2 | 3.0 | 3.0 | 2.9 | 2.9 |
| Haze,% | 35 | 34 | 47 | 100 | 101 | 170 |
| Gloss (20°) | 94 | 94 | 85 | 81 | 80 | 74 |
| Gloss (60°) | 96 | 95 | 95 | 94 | 94 | 92 |

(c) denotes a comparative example.

In the examples of Table 5, the grafted acrylate rubber was a 50/50 (wt %) mixture of ASA 1 and ASA 2.

TABLE 5

| Rubber: 50% ASA 1/ 50% ASA 2 | E-0 (c) | E-1 | E-2 | E-3 |
|---|---|---|---|---|
| MA 1 | 0.0 | 3.0 | 4.0 | 5.0 |
| Triamine | 0.0 | 1.9 | 2.5 | 3.1 |
| MFI | 6.4 | 2.4 | 1.7 | 1.4 |
| MMP | 856 | 972 | 1001 | 1030 |
| Vicat (1 Kg), ° C. | 112.4 | 114.0 | 112.1 | 112.8 |
| Impact strength (⅛" at RT) | 2.3 | 3.3 | 2.9 | 2.8 |
| Impact strength (¼" at RT) | 1.8 | 2.2 | 2.1 | 2.0 |
| Tensile strength at yield, psi | 5660 | 4880 | 5020 | 5120 |
| Tensile strength at Failure, psi | 4770 | 4380 | 4400 | 4580 |
| Elongation, % | 70 | 91 | 78 | 87 |
| Modulus, $10^{-5}$ psi | 3.4 | 2.9 | 2.9 | 3.1 |
| Haze, % | 21 | 100 | 160 | 224 |
| Gloss (20°) | 89 | 78 | 71 | 60 |
| Gloss (60°) | 97 | 94 | 91 | 88 |

(c) denotes a comparative example.

Although the invention has been descried in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a grafted acrylate rubber and an effective amount of a gloss reducing agent, said agent being the reaction product of
   (i) a compound having two or more maleic anhydride groups per molecule, and
   (ii) a compound having two or more terminal primary amine groups per molecule wherein
the grafted acrylate rubber is present in the composition in an amount of at least 85% and less than 98.4% and the gloss reducing agent is present in an amount greater than 1.6% and up to 15% the percents being relative to the weight of the composition.

2. The thermoplastic molding composition of claim 1 wherein the grafted acrylate rubber is present in the composition in an amount of 88 to 98% and the gloss reducing agent is present in an amount of 2% to 12% the percents being relative to the weight of the composition.

3. The thermoplastic molding composition of claim 1 wherein the grafted acrylate rubber is present in the composition in an amount of 92 to 97.9% and the gloss reducing agent is present in an amount of 2.1 to 8% the percents being relative to the weight of the composition.

4. The thermoplastic molding composition of claim 1 wherein the maleic anhydride compound is a compound having a number average molecular weight of at least 2000 g/mole.

5. The thermoplastic molding composition of claim 4 wherein the maleic anhydride compound includes in its molecular structure elements derived from (a) at least one vinyl monomer that contains no maleic anhydride functionality and (b) at least one maleic anhydride functional group.

6. The thermoplastic molding composition of claim 4 wherein the maleic anhydride compound has a number average molecular weight of 25,000 to 100,000 g/mole.

7. The thermoplastic molding composition of claim 4 wherein the maleic anhydride compound has a number average molecular weight of 3,000 to 75,000 g/mole.

8. The thermoplastic molding composition of claim 4 wherein the maleic anhydride compound contains 2 maleic anhydride functional groups per molecule.

9. The thermoplastic molding composition of claim 4 wherein the maleic anhydride compound contains 2 to 200 anhydride functional groups per molecule.

10. The thermoplastic molding composition of claim 4 wherein
the maleic anhydride compound contains 5 to 180 anhydride functional groups per molecule.

11. The thermoplastic molding composition of claim 5 wherein
(a) is a member selected from the group consisting of ethylene, propylene, styrene, acrylonitrile, (meth) acrylic acid ester, and vinyl acetate.

12. The thermoplastic molding composition of claim 1 wherein the maleic anhydride compound is a member selected from the group consisting of styrene-methyl methacrylate-maleic anhydride and styrene-maleic anhydride copolymers.

13. The thermoplastic molding composition of claim 1 wherein the amine compound contains polyolefinic or polyether structural elements.

14. The thermoplastic molding composition of claim 1 wherein the amine compound contains structural units derived from at least one member selected from the group consisting of polyethylene, polypropylene and polyether.

15. The thermoplastic molding composition of claim 1 wherein the amine compound contains structural units derived from polypropylene oxide.

16. The thermoplastic molding composition of claim 1 wherein the amine compound has number average molecular weight of 300 to 18,0000.

17. The thermoplastic molding composition of claim 1 wherein the amine compound has number average molecular weight of 400 to 15,000.

18. The thermoplastic molding composition of claim 1 wherein the amine compound has number average molecular weight of 700 to 10,000.

19. The thermoplastic molding composition of claim 1 wherein the amine compound is polypropylene oxide having a molecular weight of 4000 to 6000 and containing 3 terminal primary amine functional groups per molecule.

* * * * *